United States Patent Office 3,288,694
Patented Nov. 29, 1966

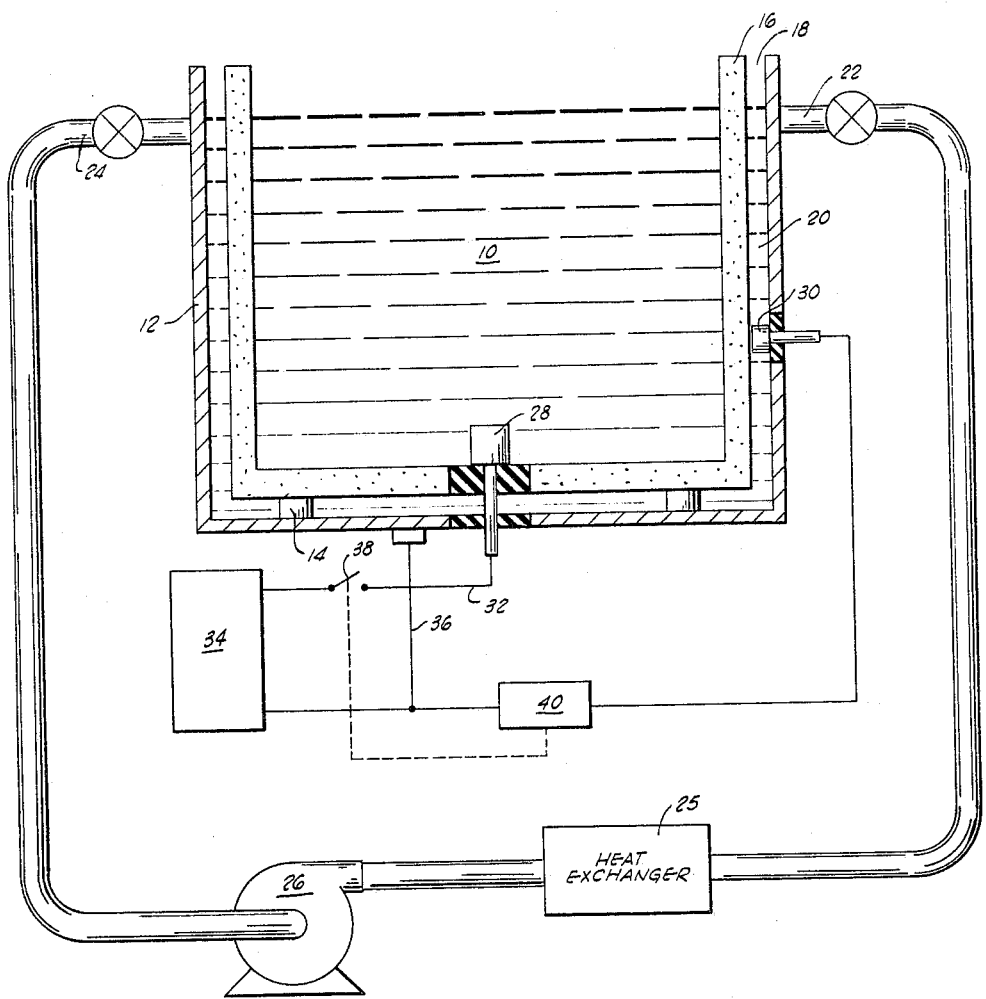

3,288,694
METHODS AND APPARATUS FOR ANODIC PROTECTION OF VESSELS
William P. Banks, Ponca City, Okla., assignor to Continental Oil Company, Ponca City, Okla., a corporation of Oklahoma
Filed Mar. 11, 1963, Ser. No. 264,385
9 Claims. (Cl. 204—147)

This invention relates, as suggested by the title, to methods and apparatus for protecting metallic vessels against the corrosive influence of a corrosive electrolyte contained therein by the use of anodic electrolytic passivation. More particularly, the invention is concerned with improvements in previously known corrosion control techniques which rely upon the controlled passage of electrical current between an anodically polarized vessel and an inert cathode immersed in a corrosive electrolyte contained in the vessel.

It has been recognized by electrochemists that when a metal anode becomes polarized, corrosion of the metal sometimes ceases. Just how this occurs is not fully understood and the maintenance of a large metal object, such as a process vessel, in this passive state in a corrosive electrolyte for an extended period of time has been achieved only very recently. An outgrowth of this achievement has been the development of a commercial apparatus and method for protecting industrial equipment from corrosion when in contact with corrosive electrolytes.

In the systems now in commercial usage, corrosion protection is achieved by suspending an inert electrode in the corrosive electrolyte which is in contact with the metal vessel or other metallic object to be protected, making the inert electrode the cathode and the metal the anode in an electrical circuit, and passing a quantity of direct current through the electrolyte between the metal and the inert electrode to cause the metal to become passivated or nearly immune to corrosive attack by the electrolyte. When this state of the metal is achieved, the desired passage of current may be discontinued or sharply reduced. The metal will then retain its passivity for a limited period of time, the duration of which will depend upon the particular metal, electrolyte and temperature which are involved.

As the metal varies in its susceptibility to corrosive attack by a particular electrolyte, its electrical potential varies. Thus, if this potential is monitored, the state of passivity or nobility of the vessel can at all times be determined so that it may be known at what times, and to what extent, current should be passed between the metal and the cathode in order to retain the metal in its passive state. In the present state of development of anodic corrosion protection systems, the susceptibility of the metal to corrosion is monitored by intermittently or continuously measuring the potential difference between the metal and a reference electrode which is placed in electrical communication with the corrosive electrolyte by means of a suitable electrolytic bridge or, in some instances, by immersion of the reference electrode in the electrolyte. An anodic polarization corrosion control system of the type described is depicted in FIGURE 1 of application for U.S. Letters Patent Serial Number 94,490 filed March 9, 1961, now U.S. Patent No. 3,152,057, and assigned to the assignees of the present invention.

The ease of facility with which a vessel constructed of a given metal may be protected from corrosion using the technique and apparatus described varies with the type of corrosive electrolyte which is to be placed in contact with the metal. In the case of some electrolytes, no satisfactory degree of corrosion control can be effected with the anodic polarization technique. In other instances, protection by the passage of current between the anodic vessel and the inert electrode immersed in the electrolyte can be achieved only through the use of very high current densities, and the feasibility of anodic polarization protection may depend upon a careful estimation of the relative economics of corrosion protection as opposed to vessel replacement.

It is a major object of the present invention to extend or enlarge the utility of anodic polarization corrosion control systems so that this technique of corrosion control may be used more economically in some systems than has previously been characteristic of the use of this technique.

Another object of the invention is to permit anodic polarization corrosion control systems to be utilized to protect metallic process vessels against certain types of corrosive electrolytes which have heretofore not been susceptible to the protective effect generally afforded by this method of corrosion control.

A further object of the present invention is to improve the economy with which anodic polarization corrosion control may be practiced by reducing the amount of current required to establish passivity of the metal to be protected, as well as the amount of current which is required to maintain such passivity.

The described objects are achieved in the present invention by establishing an environment in the vicinity of the protected metal which is more conducive to the successful and economical application of anodic polarization corrosion control procedures than the environment which would exist were the corrosive electrolyte itself permitted to constitute the sole environment of the metal to be protected.

More specifically, the invention comprises providing a permeable membrane or liner inside a metallic vessel to be protected and spaced from the internal walls thereof, and then, within the space so provided, disposing an electrolyte solution which differs from the corrosive electrolyte solution, from the corrosive effects of which it is desired to protect the vessel. The electrolyte solution which is placed in the space between the permeable or porous liner and the internal walls of the vessel may differ in one or more aspects from the corrosive electrolyte on the opposite side of the permeable liner, but in each instance, the electrolyte which occupies the space between the permeable liner and the vessel walls possesses properties calculated to permit the effectiveness and economy of anodic polarization corrosion control of the vessel to be improved. In some systems, these properties of what may be termed the "barrier" or "shielding" electrolyte make possible for the first time the protection of the metal vessel against corrosion by a particular type of electrolyte therein through the use of the anodic polarization technique.

I have found that several electrolyte properties are of special importance relative to the current requirements necessary to render a metallic vessel passive to corrosive attack, as well as the current requirements necessary to maintain the vessel in such passive state. Thus, it has been determined that higher concentrations of the corrosive electrolyte permit the metallic vessel to be passivated through the use of lower current densities than is possible when the same corrosive electrolyte of lower concentration is in contact with the vessel. Also, a reduction in the temperature of the corrosive electrolyte appears to reduce the quantity of current which is required to passivate the vessel, as well as to maintain the vessel in a passive state. Finally, in some instances where the particular type of corrosive electrolyte contained in a metal vessel has not heretofore been found to admit of effective corrosion control using the anodic polarization of corrosion control system described, I have determined that the use of this technique may be made possible by interposing between such corrosive electrolyte and the internal walls of the vessel in which it is contained, a barrier of a different electrolyte which does itself permit the anodic corrosion control system to be utilized.

In summary, then, the present invention contemplates the placement or disposition of a barrier layer of a first electrolyte between the metallic vessel and the body of the corrosive electrolyte which is to be contained therein, with said first electrolyte differing from the corrosive electrolyte either in having a lower temperature, a higher concentration, a different chemical constitution, or all of these properties in combination, to the end that the technique of anodic polarization corrosion control may be utilized to protect the vessel from corrosion, or in instances where it has been so used before, to improve the economy with which this method of corrosion control may be practiced.

In addition to the advantages which characterize the invention and the objects which have been hereinbefore enumerated, additional objects will become apparent to the reader from the following detailed description of the invention, when such description is considered in conjunction with a perusal of the accompanying drawing which illustrates my invention. The sole drawing of the application schematically depicts an anodic corrosion control system in use to protect from corrosion, a metallic vessel which has been constructed in accordance with the present invention. The vessel is shown in vertical cross section.

Before discussion the vessel construction in detail, it will be helpful to consider some general principles which must be considered in applying anodic polarization corrosion control techniques to any given process vessel-corrosive electrolyte system. In order to initially establish the corrosion characteristics of a metal contacted by a particular electrolyte in terms of the metal's electrical potential and the current required to passivate the metal so as to reduce or eliminate the corrosion thereof by the electrolyte, a polarization curve is first obtained in which the electromotive force (E.M.F.) between the reference electrode and the metal is plotted against the current required to maintain a fixed potential difference for a given period of time. Also, a series of curves are obtained in which the loss of weight of the metal due to corrosion is plotted against the potential difference between the reference electrode and the vessel. These curves establish (a) whether or not the metal may be protected, (b) the potential at which the metal should be held (in terms of the potential difference between the reference electrode and the metal), (c) the current required to establish passivity, (d) the current required to maintain possivity, and (e) the potential range in which it is possible to obtain protection. If it develops from these determinations that the metal may be protected against the particular corrosive electrolyte in use, and that the values of current or current density which are required to establish and maintain passivity are sufficiently low to render the process economical, then the continuously determined values of the potential difference between the reference electrode and the metal to be protected may be fed into suitable control instrumentation for causing the necessary current to be passed between the metal and the inert cathode whenever the potential of the metal indicates that this is required to maintain or restore the metal to a passive state.

Tests of the type described indicate that, in some instances, the anodic polarization corrosion control technique is incapable of affording protection to a metal. I have further observed that the current requirement in systems where the electrolyte is maintained at a low temperature are lower than in the case of a hot electrolyte, and that the current required in the high concentrations of electrolyte to maintain passivity is lower than that required in the same electrolyte when its concentration is relatively low. The differences in current requirements which obtain when the temperature and concentration of a corrosive electrolyte is varied may be illustrated by the following data which I have obtained.

Table 1 indicates the current density required to obtain and maintain passivity in a 1020 mild steel vessel at 80° F., in sulfuric acid solutions of varying concentrations.

TABLE 1

| Acid Concentration, Percent H$_2$SO$_4$ | Current Density, ma./square inch | |
|---|---|---|
| | To Obtain Passivity [1] | To Maintain Passivity [2] |
| 105.0 | 40 | 0.002 |
| 100.2 | 3 | 0.006 |
| 96.3 | 50 | 0.010 |
| 88.9 | 150 | 0.010 |
| 67.1 | 600 | 0.070 |
| 55.0 | 400 | 0.140 |

[1] Taken with coupons that, in general, were passivated in a few seconds.
[2] After 24 hours, taken with a vessel having a surface area of 220 square inches.

It may readily be perceived that, in general, the current densities required for obtaining and maintaining anodic passivity, are high at low acid concentrations and are low at the higher acid concentrations.

In Table 2, the current densities required to obtain and maintain passivity of a 1020 mild steel vessel against corrosion by concentrated sulfuric acid at a low and at a high temperature are tabulated.

TABLE 2

| Acid Concentration, Percent H$_2$SO$_4$ | Temperature, ° F. | Current Density, ma./square inch | |
|---|---|---|---|
| | | To Obtain Passivity | To Maintain Passivity [2] |
| 96.3 | 80 | [1] 50 | 0.3 |
| 93.3–100.0 | 535 | [2] 650 | 2.0 |

[1] Taken with coupons that were passivated within a few seconds.
[2] From current vs. potential data taken at 3 minute time intervals.

In Table 3 are tabulated the results of tests of the amount of weight lost by a vessel due to corrosion by a concentrated sulfuric acid electrolyte when the electrolyte is at a high temperature and when the electrolyte is at a low temperature. The tests were conducted both when the vessel was under the protection of an anodic polarization corrosion control system and when it was not.

TABLE 3

| Acid Concentration, Percent H$_2$SO$_4$ | Temperature, ° F. | Weight Loss, Mg./sq. in.* | | Percent Protection* |
|---|---|---|---|---|
| | | Protected | Unprotected | |
| 95.6 | 80 | 0.9 | 5 | 82 |
| 100.2 | 80 | 1.1 | 24 | 95 |
| 95.6–100.0 | 200 | 10.0 | 64 | 84 |

*24 hour tests.

The data of Tables 2 and 3 clearly show that corrosion proceeds at a higher rate at higher temperatures than at lower temperatures and that higher current densities are required to obtain and maintain the metal in a passive state at the higher electrolyte temperatures.

Based upon the results represented by the data set forth in the foregoing tables, the present invention broadly contemplates the interposition of an electrolyte having one or more properties which render it more suitable than the main electrolyte for contact with the metal vessed to be protected within the vessel between such main corrosive electrolyte and the internal walls of the vessel. In order to preserve the interface between the two electrolytes and to reduce the rate of diffusion of one electrolyte into the other, a porous or permeable solid material is placed between the two electrolytes at the interface thereof.

The manner in which the apparatus used in practicing the invention is assembled is illustrated in the accompanying drawing.

A corrosive electrolyte which it is especially difficult to prevent from severely attacking a metal vessel in which it is contained is represented by reference character 10. The vessel holding the corrosive electrolyte is represented by reference numeral 12 and may be constructed of mild steel, stainless steel or any of the other metallic materials commonly employed in the construction of process of storage vessels. Spaced inwardly from the internal walls of the vessel 12 and supported by suitable blocks or runners 14 upon the bottom of the vessel is a permeable liner 16 of porous material, such as fritted glass, stone, brick, porous plastic, etc. The drawing is, of course, schematic, and while the thickness of the permeable member or liner positioned inside the metallic vessel to be protected and spaced from the internal walls thereof is shown as thicker than the vessel wall itself, in actual practice, it will be preferable in most cases to maintain the thickness of the liner as small as practicable.

The space 18 which is defined between the permeable liner 16 and the vessel 12 is filled with a second electrolyte 20 which possesses certain desirable properties or characteristics differing from the properties of the corrosive electrolyte 10 in the manner hereinafter explained. The electrolyte 20 may be introduced to the space 18 through a suitable inlet conduit 22 and may be removed therefrom through a suitable discharge conduit 24. The discharge conduit 24 may suitably be connected through a heat exchanger 25 and pump 26 to the inlet conduit 22 so that the second electrolyte 20 may be continuously circulated in the space 18.

In order to improve the economy with which the metallic vessel 12 may be protected from corrosion utilizing a system such as the anodic polarization corrosion control system, the electrolyte 20 which is positioned in the space 18 between the vessel 12 and the permeable liner 16 may be one having a high concentration and a low temperature, or either of these properties. In most instances, it will be preferable to use an electrolyte 20 in the space 18 which has substantially the same general chemical composition as the chemical composition of the corrosive electrolyte 10. Thus, in a situation in which it is desired to store hot dilute sulfuric acid in a metallic vessel, the economy with which the vessel may be protected against corrosion may be improved by filling the space 18 with relatively cool sulfuric acid having a high concentration. The permeable liner 16 permits the process of electrolysis which forms the basis of anodic polarization corrosion control to proceed without interference since the migrating ions carrying the electrical current can pass through the permeable liner. However, the liner functions to reduce diffusion of the more concentrated cool electrolyte 20 into the hot dilute acid 10 so that, over extended periods of time, very little change in the concentration of the main body of the corrosive electrolyte 10 occurs as a result of contamination by the electrolyte 20. Where a difference in the temperatures of the electrolytes 10 and 20 is one of the factors relied upon to reduce the amount of current required to obtain and maintain passivity of the vessel 12, it is desirable that the permeable liner 16 be constructed of a material having a relatively low coefficient of thermal conductivity so that this element of the invention acts as a thermal insulator tending to maintain the temperature differential between the two electrolytes.

In addition to improving the economy with which anodic polarization corrosion control may be practiced in the case of certain electrolyte-metal vessel systems, the principle of the present invention may be extended to certain systems in which anodic corrosion protection is not feasible as a result of the particular chemical character of the corrosive electrolyte. A system of this type, for example, is one in which a carbon steel vessel is utilized to contain a corrosive electrolyte comprised of about 1.81 percent by weight nitric acid, 76.6 percent by weight sulfuric acid and 21.6 percent by weight water. When this mixed acid electrolyte is maintained in the carbon steel vessel at temperatures of around 80° F., attempts to reduce or prevent corrosion of the vessel by the anodic polarization technique are largely unsuccessful. It is well-known, however, and is demonstrated by the data set forth in the above tables that anodic protection of carbon steel is highly effective when the corrosive electrolyte in contact with the steel is concentrated sulfuric acid, of at least about 70% by weight, maintained at a temperature of 80° F. Therefore, using the principle of the present invention and apparatus of the general type shown in the drawing, the space 18 between the permeable linear 16 and the vessel 12 may be filled with concentrated sulfuric acid at a relatively low temperature and the larger space defined on the interior of the permeable liner 16 may be used to contain the mixed acid composition of the type described. With this arrangement, electrolytic corrosion control techniques can be effectively used and the extent of contamination of the mixed acids by the concentrated sulfuric acid is not such as to upset the chemical balance of the mixed acid composition.

The remaining elements depicted in the drawing are those which are conventionally employed in monitoring the potential of the vessel 12 with respect to a constant potential reference electrode and in passing passivating electric current between the vessel and an inert electrode immersed in the electrolyte contained therein. The latter electrode is designated by reference character 28 and is preferably positioned in the center of the vessel 10 inside the permeable liner 16 in order to assure even current distribution between the inert electrode and the walls of the vessel 12. The inert electrode may, however, be positioned in the space 18 between the liner 16 and the vessel 12 if convenience dictates such an arrangement. A reference electrode 30, which may be a calomel, silver-silver chloride or other suitable half-cell of substantially constant potential, is positioned either inside the liner 16 or in the space 18 between the liner 16 and the vessel 12 as illustrated in the drawing.

In the anodic polarization corrosion control system the inert electrode 28 is connected through an electrical lead 32 to the negative terminal of a battery 34 or other suitable source of direct current and the vessel 12 is connected through a second electrical lead 36 to the positive terminal of the battery. The inert electrode 28 is thus made cathodic with respect to the vessel. A suitable switch 38 is provided in the electrical circuit which includes the battery 34, vessel 12 and inert electrode 28. As has been previously explained, the control of the closure of switch 38, and consequently, of the passage of current between the vessel 12 and the inert cathode 28 is effected by means of the reference electrode 30 and suitable control circuitry 40.

As the potential of the metallic vessel 12 is varied, its susceptibilty to corrosive attack by the corrosive electrolyte contained therein is also varied. An indication of the passivity of the vessel or its immunity to corrosive attack can therefore be determined by observing the variation in the potential difference between the standard, reference electrode 30 and the metallic vessel 12. Since the potential of a properly functioning reference electrode remains constant, variations in the potential difference between this electrode and the vessel 12 will be indicative of a change in the potential of the vessel 12 and hence a change in its susceptibilty to corrosive attack. The controller 40 converts the variation in this potential difference to control signals which operate the switch 38 so that current is passed between the vessel 12 and inert cathode 28 at such times as may be required to maintain or restore the metal of the vessel 12 to a passive state.

From the foregoing description of the invention, it will be apparent that the present invention provides a method and apparatus for extending the field of application of anodic polarization corrosion control techniques and, also, improves the economy with which such corrosion control processes may be generally practiced.

Although it will be readily apparent to those skilled in the art that certain modifications and innovations may be made in the arrangement of parts, and details of procedures hereinbefore set forth by way of example, it is my intention that such changes be considered to be encompassed within the pale of the present invention unless such changes involve a departure from the basic principles underlying the invention as defined by the following claims.

I claim:

1. In a system of anodically protecting a metallic vessel from corrosion by a corrosive electrolyte contained therein, said system including an inert electrode, a controller means and a reference electrode connected to said controller means, a current source connected between said inert electrode and said metallic vessel and responsive to the output of said controller means, the improvement which comprises a permeable liner in said vessel spaced inwardly from the metallic vessel walls thereof and adapted to contain said electrolyte on the innermost side and a different electrolyte between said vessel and said permeable liner, said liner being a porous solid which is electrolytically permeable but which prevents any appreciable intermixing of electrolytes on opposite sides thereof.

2. In a method for controlling the rate of corrosion of a metallic container by a corrosive electrolyte contained therein, by making the container an anode with respect to an inert cathode contained therein and passing an electrical current between the container and said cathode to vary the passivity of said container, measuring the potential of said container and said electrolyte with respect to a reference electrode, said measurement being indicative of the state of passivity of said container, and controlling said electrical current in order to maintain a predetermined potential, the improvement comprising:
    (a) reducing the temperature of the corrosive electrolyte adjacent the metallic container; and
    (b) providing an electrolytically-permeable, thermally insulating liner element between the reduced temperature corrosive electrolyte and the remainder of the corrosive electrolyte, said liner constructed so as to prevent any appreciable intermixing of electrolytes on opposite sides thereof.

3. A system for minimizing corrosion of the metallic vessel containing a corrosive electrolyte comprising:
    (a) an inert electrode in the electrolyte;
    (b) a source of direct current energy;
    (c) circuit means connecting the energy source between the inert electrode and the metallic vessel in a direction to make the inert electrode a cathode and the metallic vessel an anode;
    (d) a reference electrode communicating electrochemically with the corrosive electrolyte to provide a potential between the metallic vessel and the reference electrode indicative of the nobility of the vessel;
    (e) a switch in said circuit means;
    (f) controller means for said switch connected to the metallic vessel and to the reference electrode for opening said circuit means when said potential reaches a level corresponding to a predetermined maximum nobility of the metallic vessel and for closing said circuit means when said potential reaches a level corresponding to a predetermined minimum nobility of the metallic vessel;
    (g) a permeable liner adjacent to the internal walls of said metallic vessel and spaced inwardly therefrom and adapted to contain said corrosive electrolyte on the innermost side of said permeable liner and a second less-corrosive electrolyte between said metallic vessel and said permeable liner, said permeable liner being a porous solid which is electrolytically permeable but which prevents any appreciable intermixing of said corrosive electrolytes on opposite sides of said permeable liner.

4. A system as claimed in claim 3 wherein said permeable liner is thermally insulating and said second electrolyte is at a lower temperature than said first-mentioned electrolyte whereby the current density which is required at the anode constituted by said metallic vessel in order to minimize corrosion of the vessel is less than the corresponding current density required to minimize said metallic vessel corrosion when said first-mentioned corrosive electrolyte is in direct contact with said metallic vessel.

5. A method as claimed in claim 2 wherein the solute and solvent of the said electrolyte adjacent the metallic container is of the same chemical character as the solute and solvent of said remainder of the corrosive electrolyte but is of higher concentration than the latter whereby the current density which is required at the anodic metallic container in order to minimize corrosion thereof is less than the corresponding current density required to minimize container corrosion when said remainder of the corrosive electrolyte is in direct contact with said metallic container.

6. A method as claimed in claim 2 wherein said corrosive electrolyte contained within the liner comprises about 1.81 percent by weight nitric acid, 76.6 percent by weight sulfuric acid and the remainder consisting essentially of water, and wherein the said electrolyte adjacent the container comprises a sulfuric acid solution having a concentration of at least 70 percent by weight and wherein said metallic vessel is carbon steel.

7. A method of anodically minimizing corrosion of a metallic vessel containing a hot corrosive electrolyte of low concentration therein comprising:
    (a) interposing a porous solid liner adjacent to and spaced from and shielding substantially the entire surface of said metallic vessel in contact with said corrosive electrolyte, said porous solid liner being electrolytically permeable but impermeable to any appreciable intermixing of electrolytes on opposite sides of said porous solid liner;
    (b) interposing between said porous solid liner and said metallic vessel surface a second corrosive electrolyte having substantially higher concentration and substantially lower temperature than the hot, low-concentration corrosive electrolyte spaced from said vessel by said porous solid liner; and
    (c) imposing a direct current potential between the metallic vessel and an inert cathode positioned in said hot corrosive electrolyte of low concentration in a direction to pass current from the metallic vessel to the inert cathode until the potential difference between the metallic vessel and a reference electrode electrochemically communicating with the electrolyte reaches a level corresponding to a predetermined maximum nobility of the metallic vessel, then discontinuing said direct current potential until the potential difference between the metallic vessel and the reference electrode reaches a level corresponding to a predetermined minimum nobility of the metallic vessel, then again imposing said direct current potential until the potential difference between the metallic vessel and the reference electrode again reaches the first-mentioned level.

8. The method claimed in claim 7 wherein each of the electrolytes employed is a sulfuric acid solution.

9. A method as claimed in claim 7 wherein said porous solid liner is a material having a low coefficient of thermal conductivity.

References Cited by the Examiner
UNITED STATES PATENTS

| | | | |
|---|---|---|---|
| 388,592 | 8/1888 | Siebel | 204—196 |
| 641,438 | 1/1900 | Darling | 204—196 |
| 1,335,210 | 3/1920 | VonWurstemberger | 204—196 |
| 2,817,634 | 12/1957 | McCall | 204—197 |
| 2,847,375 | 8/1958 | Murphy | 204—196 |
| 3,005,555 | 10/1961 | Bosworth | 204—197 |
| 3,074,865 | 1/1963 | Gaysowski | 204—196 |

JOHN H. MACK, *Primary Examiner.*

T. TUNG, *Assistant Examiner.*